(12) United States Patent
Pionetti et al.

(10) Patent No.: US 9,267,637 B2
(45) Date of Patent: Feb. 23, 2016

(54) COAXIAL PIPE ASSEMBLY INCLUDING A THERMALLY INSULATING SLEEVE

(75) Inventors: Francois-Regis Pionetti, La Baleine (FR); Loic Delebecque, Paris (FR)

(73) Assignee: Saipem S.A., Montigny le Bretonneux (FR)

( * ) Notice: Subject to any disclaimer, the term of this patent is extended or adjusted under 35 U.S.C. 154(b) by 863 days.

(21) Appl. No.: 13/122,310

(22) PCT Filed: Oct. 22, 2009

(86) PCT No.: PCT/FR2009/052017
§ 371 (c)(1),
(2), (4) Date: Apr. 1, 2011

(87) PCT Pub. No.: WO2010/049627
PCT Pub. Date: May 6, 2010

(65) Prior Publication Data
US 2011/0186169 A1    Aug. 4, 2011

(30) Foreign Application Priority Data

Oct. 29, 2008 (FR) ........................ 08 57361

(51) Int. Cl.
*F16L 9/18* (2006.01)
*F16L 59/14* (2006.01)
*F16L 39/00* (2006.01)
(Continued)

(52) U.S. Cl.
CPC ............... *F16L 59/141* (2013.01); *F16L 1/18* (2013.01); *F16L 39/005* (2013.01); *F16L 59/16* (2013.01)

(58) Field of Classification Search
CPC ......... F16L 59/14; F16L 59/143; F16L 59/12; F16L 59/141; F16L 1/18; F16L 59/16; F16L 39/005

USPC .............. 222/148, 149, 177, 114; 285/45, 53, 285/294.1, 294.3; 138/148, 149, 177, 114
See application file for complete search history.

(56) References Cited

U.S. PATENT DOCUMENTS 4,415,184 A * 11/1983 Stephenson et al. ............ 285/47
5,020,481 A *  6/1991 Nelson ........................... 122/494
(Continued)

FOREIGN PATENT DOCUMENTS

FR    2888309    1/2007
GB    2394017    4/2004
(Continued)

OTHER PUBLICATIONS

International Search Report dated Mar. 1, 2010.

*Primary Examiner* — Kevin P Shaver
*Assistant Examiner* — Robert Nichols, II
(74) *Attorney, Agent, or Firm* — Cozen O'Connor

(57) ABSTRACT

An assembly of two coaxial pipes of the PiP type, having at least two coaxial pipe unit elements each with an inner pipe and an outer pipe, defining an annular space, filled with an insulating material, and assembled end to end by welding, including a sleeve with a hollow tubular wall made of rigid or semirigid material, preferably of plastics material or composite material, surrounding the pipe in register with the welded junction zone between the two coaxial pipe unit elements, the hollow tubular wall of the sleeve having an outer casing and an inner casing connected together at their longitudinal ends in leaktight manner, thereby defining an internal volume that is completely filled with a quasi-incompressible thermally insulating material.

18 Claims, 5 Drawing Sheets

(51) Int. Cl.
*F16L 59/16* (2006.01)
*F16L 1/18* (2006.01)

(56) References Cited

U.S. PATENT DOCUMENTS

| | | | |
|---|---|---|---|
| 6,000,438 A * | 12/1999 | Ohrn | 138/149 |
| 6,450,207 B2 * | 9/2002 | Villatte et al. | 138/172 |
| 7,896,033 B2 * | 3/2011 | Hallot et al. | 138/149 |
| 8,127,801 B2 * | 3/2012 | Brower | 138/149 |
| 2004/0030016 A1 * | 2/2004 | Chomard et al. | 524/394 |
| 2007/0074778 A1 * | 4/2007 | Berti et al. | 138/145 |
| 2008/0149210 A1 * | 6/2008 | Pionetti | 138/144 |
| 2008/0296890 A1 * | 12/2008 | Prescott et al. | 285/47 |
| 2010/0139802 A1 * | 6/2010 | Papon et al. | 138/141 |

FOREIGN PATENT DOCUMENTS

| | | |
|---|---|---|
| WO | WO 02/16733 | 2/2002 |
| WO | WO 2008/053251 | 5/2008 |

* cited by examiner

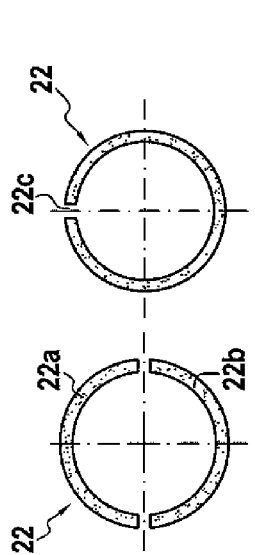
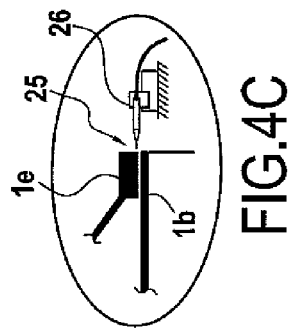
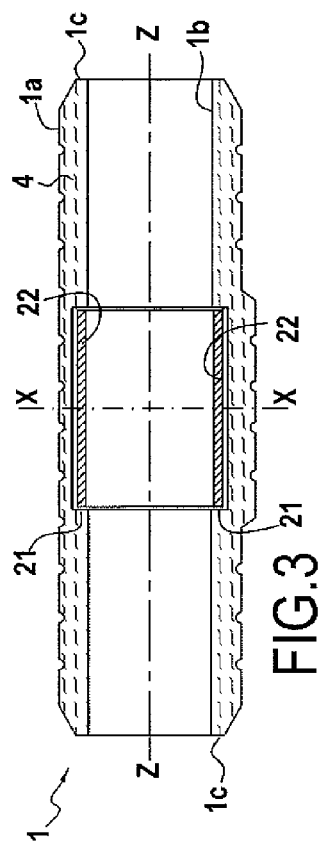
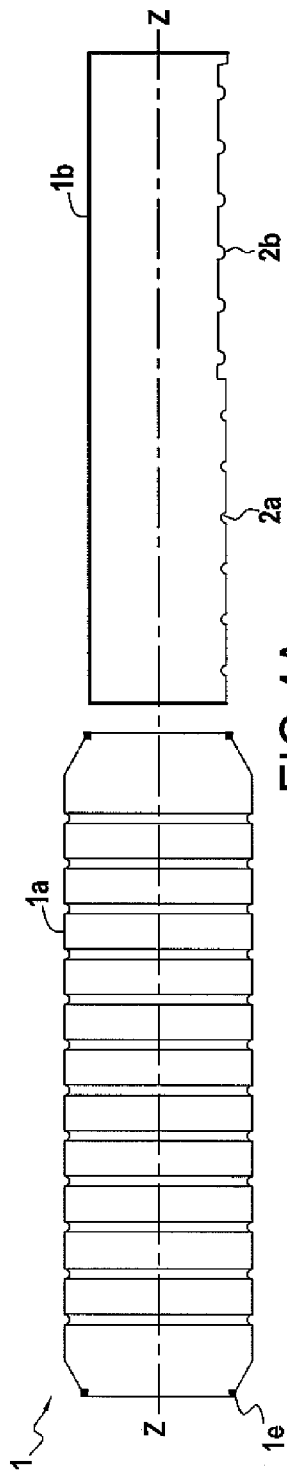
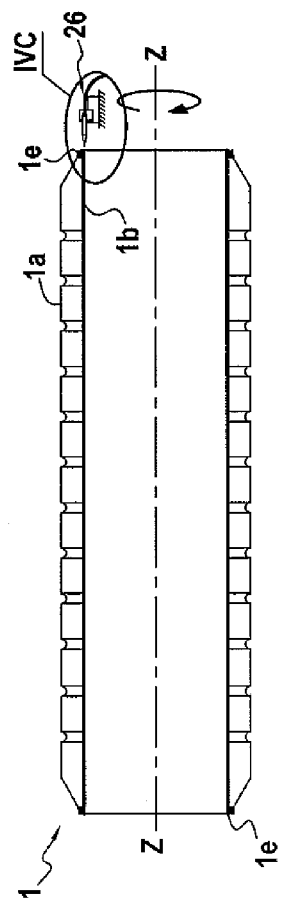

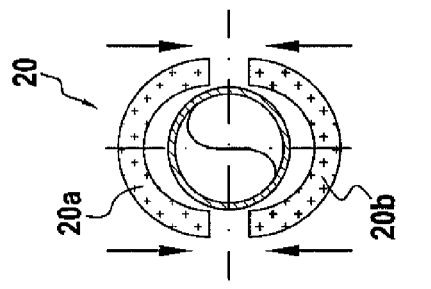
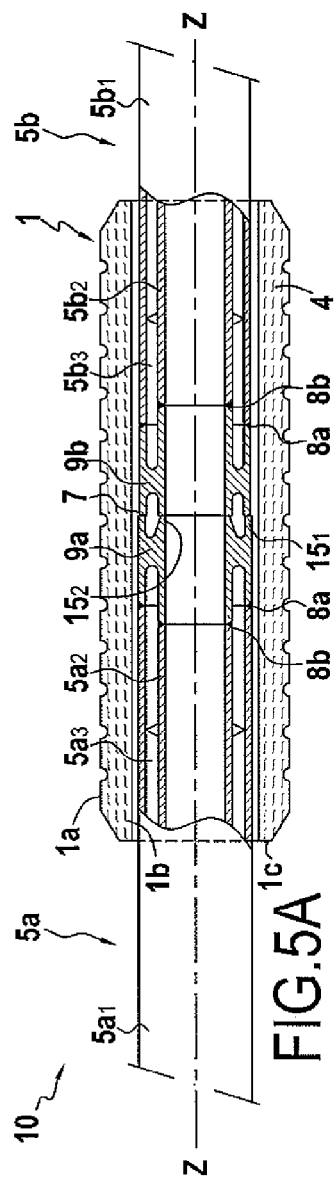
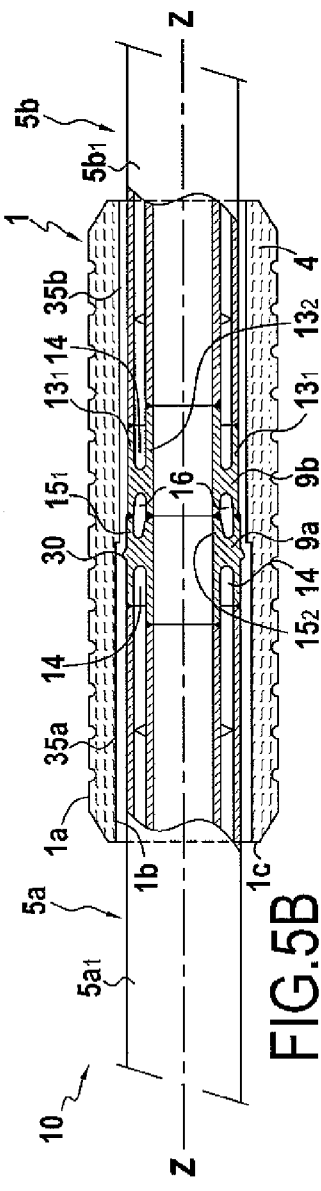
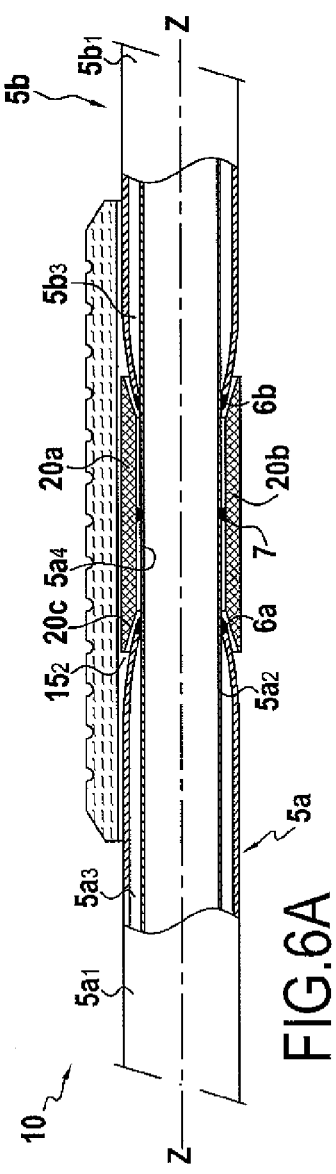

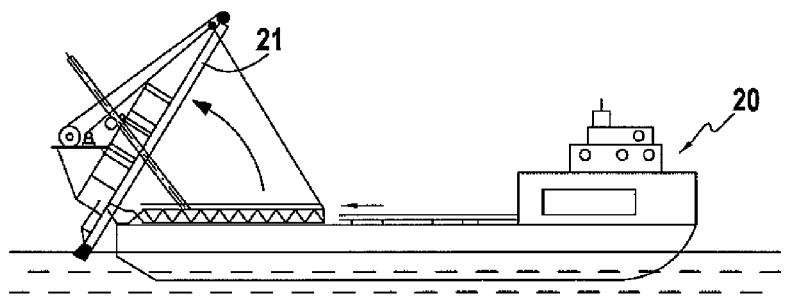
FIG.7
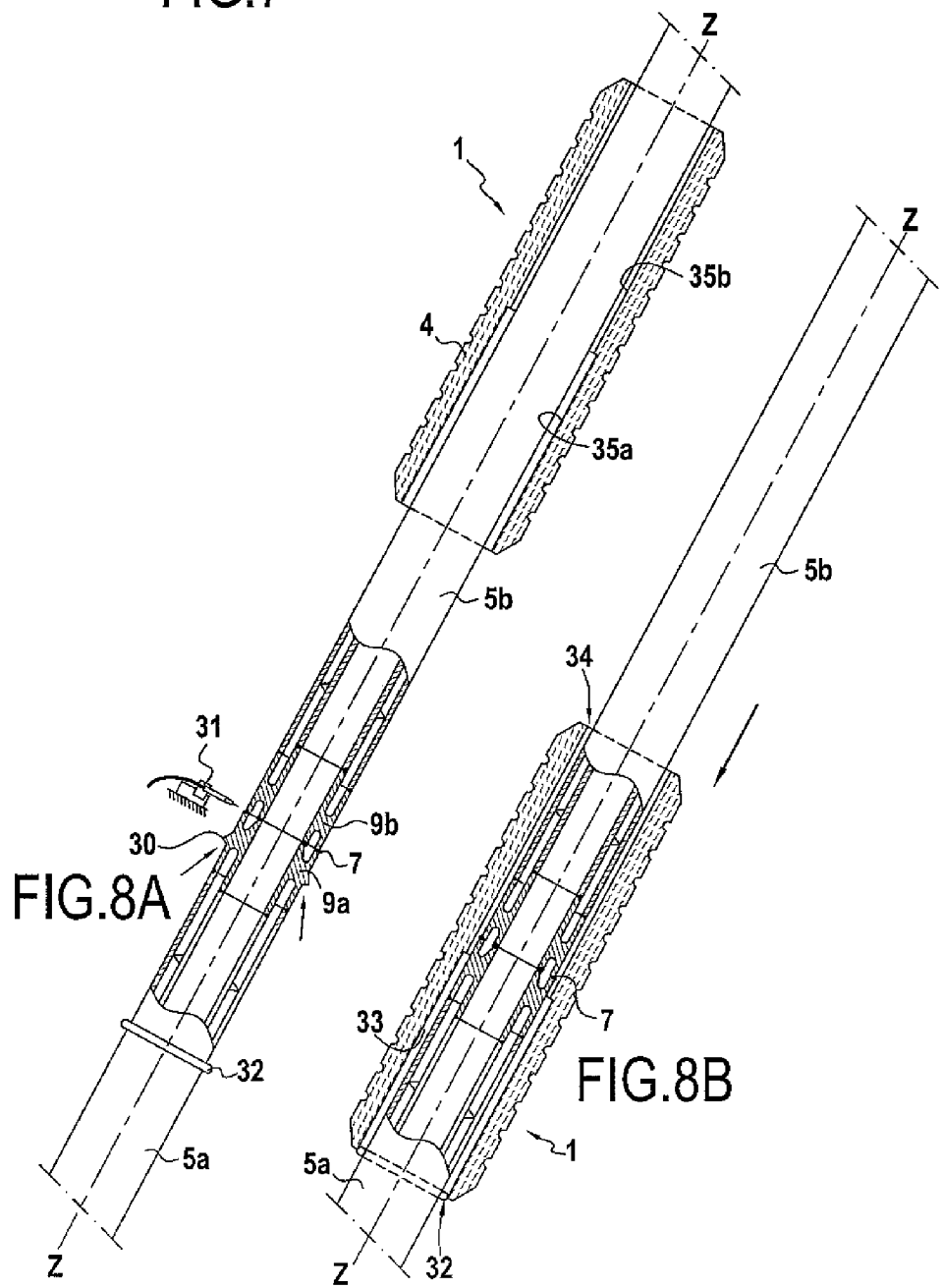
FIG.8A
FIG.8B

COAXIAL PIPE ASSEMBLY INCLUDING A THERMALLY INSULATING SLEEVE

PRIORITY CLAIM

This is a U.S. national stage of application No. PCT/FR2009/052017, filed on Oct. 22, 2009. Priority is claimed on the following application: French Application No.: 08 57361 filed on Oct. 29, 2008, the content of which is incorporated here by reference.

BACKGROUND OF THE INVENTION

The present invention relates to a coaxial pipe assembly including a thermally insulating sleeve, and more particularly a sleeve for insulating the connection zone between two coaxial pipe strings, in particular undersea pipes for conveying hot and cold fluids, and preferably undersea pipes for use in great depths.

In most industrial fields, high performance insulation systems are sought after in order to maintain the fluids that are conveyed by pipework at constant temperature so that transfer between pieces of equipment can be made possible over considerable distances, e.g. reaching as much as several hundreds of meters, or even several kilometers. Such distances are commonplace in industries such as oil refineries, liquefied natural gas installations (at −165° C.), and undersea oil fields that extend over several tens of kilometers. Such oil fields are being developed in ever-increasing depths of water, which depths may exceed 3000 meters (m).

The present invention relates in particular to coaxial pipe elements for fabricating undersea pipes installed over oil wells at great depths, in particular bottom-to-surface connection pipes in suspension between a surface ship anchored on said oil field and the sea bottom.

Such coaxial pipes are referred to as pipe-in-pipe (PiP) assemblies, with an inner pipe serving to convey the fluid and an outer pipe arranged coaxially around the inner pipe, also referred to as the "outer casing", that comes into contact with the surrounding medium, i.e. sea water. The annular space between the two pipes may be filled with an insulating material, or all gas may be evacuated therefrom.

Such systems have been developed to achieve high levels of thermal performance and specific versions have been developed to be better adapted to great depths, i.e. in order to withstand pressure at the sea bottom. Water pressure is substantially 0.1 megapascals (MPa) i.e. about 1 bar, for every 10 m of depth, so the pressure that needs to be withstood by the pipe is about 10 MPa, i.e. about 100 bars, at a depth of 1000 m, and about 30 MPa, i.e. about 300 bars, at 3000 m.

Such coaxial pipe assemblies are fabricated by butt-welding together unit lengths referred to below as "coaxial pipe unit elements" or by assembling together "coaxial pipe strings", where each string is itself made up of a plurality of pipe unit elements, and generally has a length lying in the range 10 m to 100 m, more particularly each presenting a length of 12 m, or 24 m, or 48 m.

In the context of installing undersea pipes at great depths, these unit length elements or these strings are fabricated on land. They are then transported out to sea on a laying ship. While they are being laid, the coaxial pipe assembly strings or unit elements are connected to one another on board the ship while they are being laid at sea. It is therefore important that such connection can be integrated in the method of constructing and assembling the pipe and laying in on the sea bottom.

To do this, it is general practice to use "junction pieces" or "connection forgings" that are made of steel and that are assembled to the ends of said coaxial pipe assembly elements for assembling together. The junction piece at the downstream end of a first coaxial pipe assembly element that has not yet been assembled is connected by welding to the free junction piece at the upstream end of a second coaxial pipe assembly element that has already been assembled at its downstream end.

These junction pieces also serve to reinforce the strength of pipes subjected to high levels of bending during laying, in particular in connection zones between two said successive unit lengths, and more particularly with bottom-to-surface connections, in order to give them very great resistance to fatigue throughout the lifetime of the installations.

More particularly, said junction pieces comprise two branches in the form of bodies of revolution, an outer branch and an inner branch together forming a fork defining said annular space, the free cylindrical ends of the fork being assembled directly to the cylindrical ends respectively of the outer and inner pipes. Coaxial pipes and junction pieces or pieces of this type are described in particular in FR 2 873 427 and GB 2 161 565.

FR 2 786 713 and FR 2 897 919 describe another embodiment in which a junction piece is not used to close the annular space between the inner and outer pipes at their ends, but rather the ends of the inner pipe are caused to project relative to the ends of the outer pipe and a terminal portion of the outer pipe is deformed around the terminal portion of the inner pipe by constricting its diameter until the two pipes come close together so as to close the annular space, in particular by welding together the ends of the outer and inner pipes. This type of closure of the annular space and of junction between the ends of the coaxial pipes is referred to as "crimping". It is advantageous since it allows a welding machine to have access to the ends of the inner pipes of both successive coaxial pipe elements that are to be assembled together in order to butt-weld them without being impeded by the associated outer pipes. The space between the ends of the two outer pipes of the two coaxial pipe elements assembled end-to-end is generally covered by a tubular sleeve providing insulation and mechanical reinforcement to the junction, in particular a sleeve that slides over said outer pipe.

The object of the present invention is thus to provide PiP type coaxial pipes, in which the pipe strings or unit elements present over their entire length, apart from at their ends, a level of insulation that is extreme because of the presence of an insulating material in the annular space between their inner and outer pipes, preferably associated with pumping out a high vacuum so as to limit phenomena of heat being transmitted by convection. In contrast, at the ends of said strings, the solid metal connection between the outer pipe and the inner pipe, whether via a junction piece or by crimping, eliminates thermal insulation between the ambient medium, generally water at 3° C.-5° C. at very great depth, and the oil being conveyed, generally at a temperature lying in the range 40° C.-45° C. to 80° C.-100° C., or even higher. It therefore follows that a particularly large amount of heat transfer takes place via said junction zone, whether provided by welding together two said junction pieces or via "crimped" coaxial pipe unit elements, with a consequent loss of heat from the oil being conveyed, thereby running the risk of giving rise to plugs of paraffin or to the formation of gas hydrates, should the temperature drop below 30° C.-35° C. at any point along the bottom-to-surface connection. Thus, it is desirable locally to restore a level of insulation at each of the junctions between strings that is sufficient to enable oil to be conveyed between the well heads and the surface with minimum loss of heat.

This thermal bridge problem is even more critical in the event of production being stopped, since the crude oil column is then stationary and although heat losses from the main portion of the string remain low, given the extreme level of insulation due to the PiP principle, the same does not apply at the connections between strings because of the thermal bridges created thereby. A PiP string having a unit length of 48 m presents a level of insulation over its main portion that is better than 1 watt per square meter per kelvin (W/m$^2$/K), with its mean value being degraded by 10%-12% as a result of the thermal bridge existing at each of its ends, when said ends are not insulated. If the unit length is half that, i.e. 24 m, then the degradation due to non-insulated ends is doubled, i.e. 20%-25%. Similarly, for strings having a length of 12 m, the degradation can be as much as 40%-50%, thereby depriving PiP technology of any advantage, given the great complexity and cost involved in fabricating it.

The term "mean degradation value" is used herein to mean the overall loss of heat from the length of a string, including the junction pieces or the crimped zone at each of its two ends, divided by the length of said string.

External pipe insulation means are known that withstand high hydrostatic pressures and that are therefore suitable for being used at great depths, said means being constituted by:

coatings of quasi-impressible solid polymer materials based on polyurethane, polyethylene, polypropylene, etc., that, where appropriate, are in the form of a solid tubular sleeve. However such materials present fairly mediocre thermal conductivity and thermal insulation properties, i.e. properties that are not sufficient to overcome the drawbacks in the event of production being stopped in undersea pipes conveying hydrocarbons; or coatings of synthetic materials constituted by hollow beads containing gas and capable of withstanding external pressure, the beads being embedded in binders such as concrete, epoxy resin, etc. . . . presenting thermal insulation properties that are better, but that are considerably more expensive and more difficult to install. In practice, recourse is made to half-shells that are assembled around the welded junction that needs to be protected after the welding has been performed.

Furthermore, insulating materials are known that present superior thermal insulation properties, i.e. lower thermal conductivity, and in some cases associated with phase-change properties, in particular materials in gel form.

Materials of this type are described in particular in the following patents: FR 2 800 915; FR 2 820 426; FR 2 820 752; WO 2004/003424; and WO 00/40886. Nevertheless, because of their insufficient mechanical strength and because they are obtained by physical and chemical or physicochemical reactions between a plurality of components, such insulating gels need to be injected in liquid form immediately after their various components have been mixed together and inserted or injected between the outer and inner pipes of a PiP type coaxial pipe assembly.

The mechanical strength of such a gel is insufficient on its own for withstanding the mechanical stresses to which pipes resting on the sea bottom are subjected, so they are not implemented on the outsides of the outer pipes of PiP pipe assemblies. That is why they are not suitable for insulating junction zones between two PiP pipe sections assembled together by butt-welding, possibly via junction pieces constituting bodies of revolution.

Document WO 2008/053251 describes various means for insulating a thermally insulating sleeve for the junction zone between two pipe unit elements, said thermally insulating sleeve being constituted by PiP pipes of steel connected together at their ends by crimping, with the annular space thereof containing a thermally insulating material.

In WO 2008/053251, in its FIGS. 3 and 4, the inside volume between the two walls of the sleeve is partially filled with an insulating material (see page 13, lines 14 to 22) and partially filled with a gas such as air.

In that document, on page 13, line 20, it is stated that the steel PiP structure provided the insulation for the junction zone is expensive and heavy. That is why, that document proposes an improvement using an insulation system as described in FIG. 5, in which the sleeve is replaced by a lighter casing together with a single steel pipe element (see page 18, lines 26 et seq.), which element is covered in multilayer insulation (see page 19, lines 5 et seq.) of expanded polypropylene foam or polyurethane syntactic foam.

However, such a steel sleeve is counterproductive in terms of thermal insulation, given the high thermal conductivity of steel.

SUMMARY OF THE INVENTION

An object of the present invention is thus to provide improved thermal insulation devices for the welded junctions between coaxial pipe unit elements that are connected together end-to-end.

To do this, the present invention provides an assembly of two coaxial pipes of the PiP type, comprising at least two coaxial pipe unit elements each comprising an inner pipe and an outer pipe, with an annular space, preferably filled with an insulating material, and assembled end to end by welding, the assembly being characterized in that it includes a sleeve with a hollow tubular wall made of rigid or semirigid material, of plastics material or composite material, surrounding said pipe in register with the welded junction zone between said two coaxial pipe unit elements, said hollow tubular wall of the sleeve comprising an outer casing and an inner casing connected together at their longitudinal ends in leaktight manner, thereby defining an internal volume filled with a quasi-incompressible thermally insulating material.

This hollow tubular wall of said insulating sleeve is particularly advantageous since it makes it possible to use insulating substances that would otherwise not present sufficient strength on their own to withstand the mechanical stresses to which pipes resting on the sea bed are subjected, while presenting high level thermal insulating properties. In particular, the hollow tubular wall serves to package thermally insulating gels, thus presenting the advantage of avoiding phenomena of convection within the insulating mass, and also the advantage of being capable of being obtained from physical, mechanical, or physicochemical reactions between different ingredients, thereby enabling it to be injected in liquid form immediately after the various ingredients have been mixed together, thus enabling the hollow tubular wall to be filled completely before bulk gelling begins in any significant manner.

Because the insulating material is quasi-incompressible, i.e. amongst other things because it does not contain gas, when the rigid or semirigid material of the hollow tubular wall of the sleeve is subjected to hydrostatic pressure at great depths, it is supported by said insulating material such that said rigid or semirigid material of the tubular wall of the sleeve does not require strength as great as that of a steel pipe.

An insulating sleeve of the invention has no steel element, but its overall stiffness stemming from the quasi-incompressible insulating material suffices to enable it to retain a stable cylindrical shape while it is being handled and finally installed on the pipe that is to be insulated.

The term "semirigid" is used herein to mean a material that is sufficiently rigid to keep it shape in spite of the weight of the insulating material contained in the sleeve, while nevertheless presenting a certain amount of flexibility so as to accommodate deformation, in particular so as to follow the deformation that results from the volume of the material changing in the event of it changing phase.

The term "tubular wall" is used to mean that said outer and inner casings may present a section in a cross-sectional plane perpendicular to the longitudinal axis XX' of said sleeve that is circular or oval in shape, or indeed polygonal.

Oval or polygonal shapes are particularly suitable when the quasi-incompressible insulating material is a phase-change material, thereby enabling the walls to deform in order to accommodate an increase in volume as a result of a change in the phase of the material, where appropriate, and as described in WO 2004/003424.

The hollow tubular wall is also particularly advantageous in that it prevents any longitudinal migration of said quasi-incompressible insulating material that it confines.

It can be understood that said incompressible insulating material presents thermal conductivity that is less than that of the material constituting said inner and outer casings of the hollow tubular wall of said sleeve.

Installing insulating sleeves at each junction provides a significant improvement in the mean insulation of a string, and the above-defined mean degradation values are then respectively about 7%-8% for a 48 m string, 14%-18% for a 24 m string, and 28%-36% for a 12 m string.

In contrast, in the event of a stop in production, performance is the same for each unit length of string, since cooling phenomena are then localized mainly at the thermal bridges, i.e. at each of the junctions between strings, i.e. respectively once every 48 m-50 m, every 24 m-25 m, or every 12 m.

Preferably said quasi-incompressible thermally insulating material is an insulating gel of phase-change material (PCM).

Preferably, the insulating gel comprises a first compound presenting thermal insulation properties, such as alkanes, having a hydrocarbon chain of at least six carbon atoms, preferably at least ten carbon atoms, mixed with a second compound consisting in a gelling polymer compound or a compound having a structuring effect, in particular by cross-linking, such as a compound of the polyurethane, polypropylene, polyethylene, or silicone type, said first compound preferably being in the form of particles or microcapsules dispersed within a matrix of said gelled or cross-linked second compound, said matrix thus confining said insulating first compound.

Such insulating gels present the advantage of being capable of being implemented in the liquid state and of transforming into a gel after a few hours, with the insulating compound being microencapsulated in the gel in a matrix of the second compound that acts as a kind of sponge suitable for confining the insulating material and for keeping it in a shape of substantially constant thickness, thereby greatly reducing convection phenomena, and were appropriate absorbing variations in volume if the insulating material is a phase-change material.

More particularly, said first compound presenting thermally insulating properties may be a phase-change insulating material, in particular alkanes or alcohols presenting a hydrocarbon chain with at least fourteen carbon atoms, such as paraffins, waxes, bitumen, tar, fatty alcohols, or indeed glycols. Under such circumstances, the gelling second compound may absorb a large fraction of the variations in volume of the first compound in the event of it changing phase.

These phase-change insulating materials are advantageous, since they behave as heat accumulators that are capable of returning energy when they solidify and conversely are capable of absorbing energy on melting. When they return accumulated energy, such materials serve to lengthen the time for which it is possible for production to be stopped without any risk of the pipe becoming clogged by premature cooling of its content.

The phase-change material advantageously presents a liquid/solid melting temperature $t_0$ lying in the range 20° C. to 80° C., that is higher than the temperature $t_1$ at which the fluid flowing inside the pipe presents an increase in viscosity that degrades the flow thereof along the pipe, and less than the temperature $t_2$ at which the fluid flows in the pipe in normal operation.

More particularly, the phase-change insulating material comprises chemical compounds of the alkane family, preferably having a long hydrocarbon chain of at least fourteen carbon atoms, such as a paraffin. Still more particularly, it may be heptacosane having the formula $C_{17}H_{36}$ and presenting a melting temperature of about 50° C.

These are compounds that combine thermal insulation properties and properties of conserving a phase-change temperature throughout the duration of a phase change, thereby slowing down cooling of the space inside the sleeve, i.e. the oil conveyed by the PiP type pipe, particularly in the event of a stop in production.

In a particular embodiment, said insulating gel is a mixture of kerosenes and polyurethane.

Kerosene is constituted for the most part by an alkane presenting a carbon chain of at least ten carbon atoms and not presenting phase-change properties.

Insulating gels of this type present the following physicochemical characteristics:

they are constituted by an insulating compound, optionally a phase-change compound, dispersed within a cross-linked matrix forming a sponge having hollow cells that are microscopic and leaktight;

the cross-linking of the matrix is either of the physical type, or of the chemical type, or indeed of the physicochemical type, said cross-linking taking place after several hours, either at ordinary temperature (10° C.-25° C.), or by heating the matrix;

the gels obtained in this way present hardness of A20 to A80 on the Shore scale, depending on the type of matrix; and they have thermal conductivity lying in the range 0.130 watts per kelvin meter (W/mK) to 0.150 W/mK.

Advantageously, at least said inner casing or preferably at least said outer casing of said sleeve is formed integrally with connection elements at its longitudinal ends, suitable for closing the space between the inner and outer casings of the hollow tubular wall of the sleeve at their ends, said part being made of thermoplastic material of small thickness, less than 10 millimeters (mm), preferably of thickness lying in the range about 4 mm to about 8 mm, being obtained by rotational molding, such as polyethylene, polypropylene, polyamide, or polyvinylidene fluoride (PVDF) in particular, and said part being fastened to the other casing, respectively the outer or the inner casing, of the hollow tubular wall of the sleeve via said connection elements.

Preferably, said part obtained by rotational molding comprises a said inner or preferably outer casing of the sleeve together with said end connection elements, and includes corrugations or grooves forming rounded or square projections or recesses in said inner casing or preferably in said outer casing of the sleeve.

It will be understood that these grooves form local variations in the diameter of said casing lying in the range 0.5 centimeters (cm) to 5 cm over a distance along the length of the sleeve lying in the range 1 cm to 10 cm, which variations are preferably regularly spaced apart over the entire length of the sleeve, thereby contributing to stiffening the tubular wall of said sleeve and to compensating its small thickness that results from its method of manufacture by rotational molding.

More particularly, one of said inner or outer casings of said sleeve that is made integrally with said end connection elements is obtained by rotational molding, while the other casing of the sleeve, respectively the outer or the inner casing, is obtained by extrusion or by rotational molding, and is fastened to said connection elements by adhesive or by heat-sealing.

When said other casing is obtained by extrusion, it does not present said grooves or corrugations, and when it is obtained by rotational molding, it may include such stiffening corrugations or grooves.

Still more particularly, said hollow tubular wall comprising said inner and outer casings and said end connection elements is obtained as a single piece in the form of a one-piece rotational molding, the inner casing preferably presenting a shape that is slightly conical, without said corrugations or grooves, so as to enable it to be unmolded.

In an advantageous embodiment, said inner casing of said hollow tubular wall of the sleeve includes a middle zone of diameter greater than the end zones adjacent thereto on either side thereof, thus forming a setback in which at least one first leaktight pouch is received surrounding the entire periphery of said coaxial pipe assembly, the pouch being filled with a non-insulating phase-change material, preferably a molten salt, the thickness of said filled pouch preferably being less than the thickness of said setback, more preferably lying in the range 1 cm to 10 cm.

The setback in said inner casing serves to hold said pouch in place by preventing it from moving longitudinally, while conserving a maximum thickness of said sleeve on either side of said pouch.

The phase-change material advantageously presents a liquid/solid melting temperature $t_0$ lying in the range 20° C. to 80° C., that is higher than the temperature $t_1$ at which the fluid flowing inside the pipe presents an increase in viscosity that degrades the flow thereof along the pipe, and less than the temperature $t_2$ at which the fluid flows in the pipe in normal operation.

Said pouches are placed close to the coaxial pipe assembly, and they are preferably not directly in contact therewith. The space between the PCM material and the pipes serves to reduce the rate at which heat is absorbed from the oil when restarting production after a stop, so that the oil remains at its temperature as long as possible and does not reach the value $t_0$ until it is sufficiently close to the surface to be able to reach the surface without the temperature dropping below the temperature $t_1$ at which certain components freeze, thereby preventing flow within the pipe.

Insofar the sleeve contains a quasi-incompressible insulating material, the PCM material included in said inner pouch is not necessarily a material having low thermal conductivity. When the PCM material is of the molten salt type, such salts generally present high thermal conductivity.

Positioning the phase-change material as close as possible to the coaxial pipe assembly optimizes its localized properties in the zone where it is most effective, i.e. essentially localized close to the pipe, since only the PCM material close to the hot pipe can accumulate heat as it liquefies, with any PCM material that is too close to sea water, generally at the temperature of the sea bottom, i.e. 4° C., therefore not contributing to the heat accumulation process; it would remain permanently solid or crystallized, and that would be harmful.

Also advantageously, said outer casing of the tubular wall of the sleeve includes a middle portion of diameter greater than the end zones adjacent thereto, in register with said greater diameter middle zone of said inner casing, so as to maintain a substantially constant thickness of quasi-incompressible insulating material within the casing in said middle zone over the entire length of said sleeve.

It can be understood that the outward projection from the largest-diameter middle portion of the outer casing seeks to compensate for the setback in the inner casing so as to conserve a thickness for the thermally insulating material contained between said inner and outer casings that is substantially constant and thereby maintain insulation that is constant over the entire length of said sleeve.

Also advantageously, said sleeve further includes a filler material filling the space or clearance between said inner casing of the tubular wall of the sleeve and said outer pipe or where appropriate inner pipe of the coaxial pipe assembly, said filler material connecting said sleeve to said coaxial pipe assembly, and preferably being a hardenable filler material of the resin or cement type, more preferably being a thermally insulating material.

According to other variant embodiments, the sleeve may be fastened to said outer pipes using end O-ring gaskets and/or spacers and/or clamping bands, with or without said filler material.

In an embodiment, each of said unit elements of the assembled coaxial pipe assembly includes at its ends a junction piece forming a body of revolution connected to said inner and outer pipes at one end of the junction piece, with the two junction pieces being assembled to each other by welding at their opposite ends, said sleeve being centered over the weld joining the two junction pieces together and extending beyond the connection welds between said junction pieces and each of said coaxial pipe assembly unit elements.

More particularly, each said coaxial pipe unit element includes at its end a said junction piece, said two junction pieces being connected together by welding, and one of said junction pieces including in its outside surface a projection in the form of an abutment or a collar suitable for enabling the coaxial pipe unit element that is connected thereto to be held in suspension in a vertical or an inclined position from a laying ship at sea, and said tubular sleeve includes an end zone with an inner casing of diameter greater than the diameter of the longitudinally opposite end, said greater-diameter end zone of the inner casing covering the coaxial pipe assembly inside said sleeve, at least starting from said projection or collar.

It can be understood that the difference in diameter between the two end zones of the inner casing is greater than the thickness of said projection or collar. This characteristic enables the sleeve to be engaged over the coaxial pipe assembly close to the outer pipe in the zone upstream from said projection or collar.

In another variant embodiment, each said coaxial pipe unit element includes an outer pipe end that is set back from the end of the inner pipe, the annular space between said outer and inner pipes being closed by crimping, which consists in deforming the terminal portion of the outer pipe so that its end is directly connected to the surface of the inner pipe, preferably by welding, and the two coaxial pipe unit elements are assembled together by welding to each other via the ends of their inner pipes, said sleeve extending over a distance of at least 50 cm and preferably at least 1 m over said outer pipe beyond the crimp welds, and the space between the inner casing of said sleeve and the inner pipe of the coaxial pipe assembly between the two crimp welds is filled with an insulating material, preferably a phase-change compound, more preferably a molten salt contained in at least one second leaktight pouch completely surrounding said inner pipe, the longitudinal end(s) of said pouch(es) preferably presenting in axial longitudinal section a profile that is chamfered in such a manner as to fit as closely as possible to said outer pipe after the crimp zone between said outer pipe and said inner casing of said sleeve.

Advantageously, said sleeve contains said first and/or second pouches forming pairs of diametrically opposite semicylindrical pouches on either side of said coaxial pipe assembly.

Thus, said first and second pouches are easier to put into place inside said sleeve.

More particularly, the length of said sleeve lies in the range 1 m to 10 m, preferably in the range 2 m to 6 m, and is of sleeve thickness preferably lying in the range 5 cm to 25 cm, and more preferably said inner and outer casings of the tubular wall of the sleeve present wall thickness lying in the range 2 mm to 10 mm.

The thickness of the sleeve means the distance between said inner and outer casings and includes the thicknesses of said inner and outer casings.

Thus, the sleeve extends over 1 m to 3 m on either side of the welding junction, and therefore, where appropriate, covers said connected-together junction pieces, and also portions of the coaxial pipe unit elements, assembled to said junction pieces, or where appropriate covers the zone between the crimping points between said outer and inner pipes of the coaxial pipe unit elements assembled together via the ends of their inner pipes, as described below.

The present invention also provides a thermally insulating sleeve having a hollow tubular wall filled with a quasi-incompressible thermally insulating material.

BRIEF DESCRIPTION OF THE DRAWINGS

Other characteristics and advantages of the present invention appear in the light of the following detailed description with reference to the following figures, in which:

FIG. 3 is a side view in section of an insulating sleeve presenting an inner pouch filled with phase-change material;

FIGS. 3A and 3B are sections on plane XX of FIG. 3 showing details of two embodiments of a said inner pouch filled with phase-change material;

FIG. 4A is a side view in section showing an inner tube being assembled inside an outer casing obtained by rotational molding to constitute an insulating sleeve;

FIGS. 4B and 4C show details of an assembly technique using hot-air welding between the inner tube and the outer casing after they have been preassembled as shown in FIG. 4A;

FIG. 5A is a side view in section showing the ends of two PiP strings assembled together by means of forgings, the assembly being surrounded by an insulating sleeve of the invention;

FIG. 5B is a side view in section showing the ends of two PiP type strings assembled together by means of forgings, one of them presenting an outer projection serving as a bearing point during installation at sea from a J-lay ship, the assembly being surrounded by an insulating sleeve of the invention, with a portion 35a having an inside diameter that is larger;

FIG. 6A is a side view in section showing the ends of two PiP type strings assembled together by "crimping", surrounded by two pouches in the form of half-shells of phase-change material, the assembly being surrounded by an insulating sleeve of the invention;

FIG. 6B is a cross-section view of two pouches filled with phase-change material;

FIG. 7 is a side view of installation ship fitted with a J-lay tower;

FIGS. 8A and 8B are side views in section showing details of an additional string being assembled on board the FIG. 7 ship, shown respectively during the welding stage and then during the stage of filling the annulus after the sleeve of the invention has been lowered into its final position.

DETAILED DESCRIPTION OF THE PRESENTLY PREFERRED EMBODIMENTS

Figure 1A:
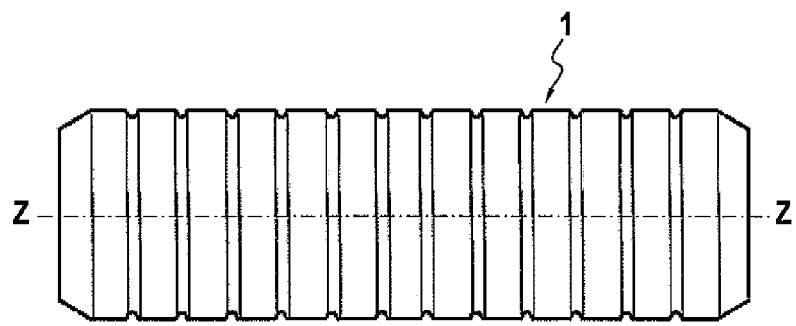
FIGS. 1A and 1B show an insulating sleeve of the invention respectively in side view and in side view in longitudinal section.
Figure 1B:
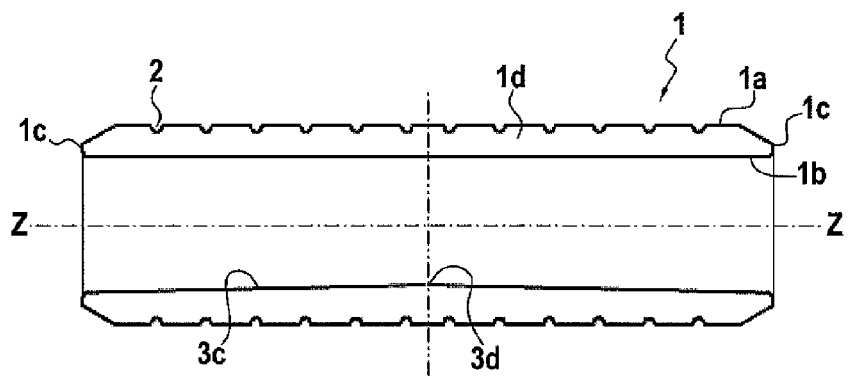

FIG. 1B is a side view in section of a thermally insulating sleeve 1 having a hollow tubular wall comprising a double wall constituted by an outer casing 1a and an inner casing 1b connected together at each of their ends 1c, the assembly defining a sealed volume 1d for filling with a quasi-incompressible insulating compound, preferably a gel, more preferably a phase-change gel capable of returning heat to the PiP type pipe around which said sleeve is placed.

In order to ensure dimensional stability of the outer casing during the fabrication process and during on-site handling, the outer casing advantageously presents circular corrugations 2 or grooves of square section forming recesses 2a or projections 2b that extend transversely to the axial longitudinal direction ZZ' of the sleeve having the wall 1a, and presenting a width of 1 cm to 5 cm in the longitudinal direction ZZ', and optionally spaced apart regularly, e.g. every 20 cm to 30 cm.

Figure 2A:
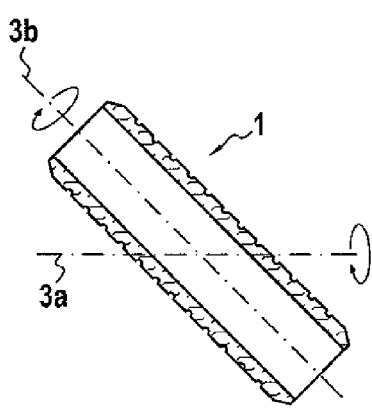
FIG. 2A is a perspective view of the rotational molding process for molding an insulating sleeve.

Said insulating sleeve is preferably obtained by rotational molding or "roto-molding" in a single operation. In FIG. 2A there is a perspective view showing the principle, known to the person skilled in the art, of using rotational molding to line a mold, which principle consists in causing a forming mold, generally made of metal, to rotate in three dimensions, generally in pseudo-random manner about two axes 3a and 3b, with granules of a thermoplastic material such as polyethylene, polypropylene, polyamide, or indeed PVDF being inserted therein and progressively heated, e.g. in a furnace, to a temperature at which the granules reach their melting temperature. The melted granules then stick to the wall of the mold, and since the mold is set into pseudo-random rotation about two axes, the thickness of the lining increases in substantially uniform manner over the entire inside surface of the mold. When all of the granules have melted, rotation is continued and the outside wall of the connection part acting as a mold is cooled either using free air or by sprinkling water. Once the mold is cold, it is opened and the roto-molded part is removed, with the outer portion generally being unmolded without difficulty, since the thermoplastic material shrinks by about 0.5% to 2%, depending on the material. In contrast, in order to facilitate unmolding the portion of the mold that is in contact with the inner casing 1b, said inner mold is advantageously fabricated in two portions, a left portion and a right portion, each of which is advantageously given a conical shape 3c, as shown in FIG. 1B, thus enabling each of said portions to be extracted, extracting the left portion to the left and the right portion to the right, with the conicity thereof advantageously lying in the range 1% to 3%, the inner casing 1b thus presenting a biconical profile with a constriction of its inside diameter in its central portion 3d and with two opposite symmetrical conical portions on either side thereof. The outer and inner casings 1a and 1b present a thickness of 5 mm to 6 mm.

Figure 2B:
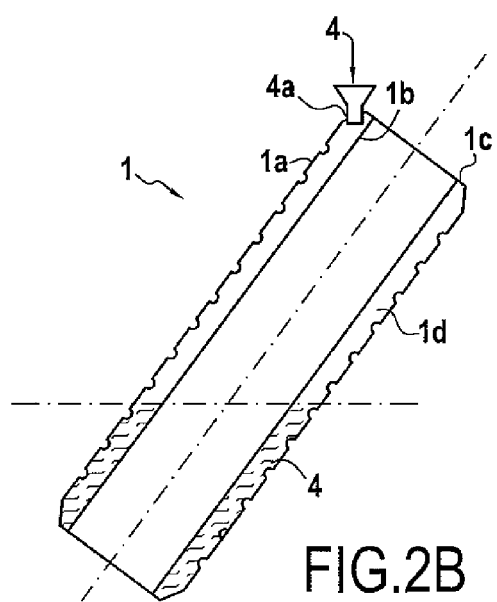
FIG. 2B is a side view in section of an insulating sleeve while it is being filled with a gel type insulating compound.

After unmolding, as shown in FIG. 2B, the inside 1d of said sleeve 1 is filled with a quasi-incompressible insulating compound 4 through a closable opening 4a. Said insulating compound, preferably of the gel type, is advantageously transferred in the liquid state until said volume 1d has been filled completely, and then the filling orifice is closed in permanent and completely sealed manner. By way of example, a polyurethane-kerosene gel is used from the supplier Arkema (France), which takes on the liquid state after its ingredients have been mixed, and which cures while cold in a few hours.

The insulating sleeve 1 is for insulating the connection zone between two strings of PiP type pipes 5a-5b, as shown in FIGS. 5A, 5B, 6A, and 8B.

FIG. 5A is a side view in section showing two strings being assembled together via two junction forgings 9a and 9b that are in the form of bodies of revolution and as described in FR 2 873 427. Each of the strings is constituted by an outer cylindrical pipe 5a1-5b1 coaxially surrounding an inner cylindrical pipe 5a2-5b2, the outer pipe 5a1-5b1 being welded in leaktight manner at 8a to one forging, itself being welded in leaktight manner at 8b to the inner pipe 5a2-5b2 so as to constitute a volume 5a3 that is filled with insulating material, preferably gas under low pressure, e.g. as described in FR 2 878 936. The two strings are assembled together by welding at 7, while they are mounted on the J-lay tower 21 installed on board the laying ship 20, as shown in FIG. 7.

The strings 5 present a length of about 12 m, 24 m, or 48 m and apart from at their ends, they present over their entire length an extreme degree of insulation resulting from the presence of an insulating material, preferably associated with being pumped out to a high vacuum to limit phenomena of heat transmission by convection. In contrast, at the ends of said connected-together strings, the massive metal connection between the two strings puts the surrounding medium, generally water at 3° C. to 5° C. at very great depth, directly into contact with the oil that is being conveyed, generally at a temperature lying in the range 40° C.-45° C. to 80° C.-100° C. or even more: this results in heat being transferred, i.e. lost from the oil being conveyed, and that runs the risk of causing the formation of paraffin plugs or of gas hydrates, should the temperature drop to below 30° C.-35° C. at any point along the bottom-to-surface connection. Thus, it is desirable to restore a level of insulation locally at each of the junctions between strings that is sufficient to ensure that the transfer of oil between well heads and the surface takes place with minimum loss of heat.

This thermal bridge problem is even more critical during stops in production, since the column of crude oil then remains stationary and although the loss of heat from the main length of the string is low, given the extreme level of insulation due to the PiP principle, the same does not apply at the connections between strings because of the heat bridges created by the connection. A PiP string having a unit length of 48 m presents a level of insulation in its main portion, referred to as its "U-value" that is less than 1 $W/m^2/K$, at its mean value and degraded by 10%-12% as a result of the heat bridge that exists at each of its ends when said ends are not insulated. If the unit length is half that, i.e. 24 m, then the degradation due to the non-insulated ends is doubled, i.e. to 20%-25%. Similarly, for strings having a length of 12 m, degradation then rises to 40%-50%, thereby depriving PiP technology of any advantage, given the great complexity and cost involved in fabricating it.

Installing insulating sleeves at each of the connections provides a significant improvement in the mean insulation of a string, and the above-defined mean degradation values are then respectively about 7%-8% for a 48 m string, 14%-18% for a 24 m string, and 28%-36% for a 12 m string.

However, in the event of a stop in production, performance is the same for all unit lengths of string since the cooling phenomenon is mainly localized at the heat bridges, i.e. at each of the connections between strings, respectively once every 48 m 50 m, every 24 m-25 m, or every 12 m.

By way of example, in the event of a stop in production, e.g. as a result of an incident on board the floating production storage and offloading (FPSO unit), a non-insulated junction of a PiP constituted by an inner pipe having a diameter of 300 mm and an outer pipe having a diameter of 400 mm, and conveying crude oil at 65° C., gives rise to a temperature drop of 48° C. in 4 hours (h) to 6 h, whereas the same junction, when insulated by a sleeve having an insulating gel injected therein, would require a duration of more than 24 h in order to observe the same temperature drop. Furthermore, if an inner pouch 22 as described below and including a phase-change compound, such as a molten salt is added, then the same temperature drop takes place after more than 30 h to 36 h, thereby greatly limiting the risk of gas hydrate or paraffin forming and thereby allowing a greater length of time for making repairs and restarting production.

The insulating sleeve of the invention is installed over each of said welding junctions 7 between strings, said sleeve presenting a thickness of insulating material inside said hollow wall lying in the range 10 cm to 30 cm, and said sleeve preferably extending on either side of said junction over a length of more than 1 m, preferably over a length of 1.5 m to 3 m, i.e., where appropriate, overlying the outer pipes 1a beyond the junction pieces 9a, 9b or beyond the crimping closure weld 6a, 6b as described below.

FIG. 6A is a side view in section showing two strings assembled together by a "crimp" type connection. Each of the strings is constituted by a tubular outer casing 5a1-5b1 coaxially surrounding an inner pipe 5a2-5b2, the outer casing 5a1-5b1 being "crimped" at each of its ends and being welded in leaktight manner at 6a, 6b to the inner pipe 5a2-5b2 so as to constitute a volume 5a3-5b3 that is filled with insulating material, preferably at a low gas pressure. The space between the sleeve and the inner pipe 5a4 that is not covered by the outer pipe is advantageously occupied by leaktight pouches 20 containing a phase-change compound, said compound being constituted in particular by a molten salt. Said pouch is advantageously cylindrical, being constituted by two diametrically-opposite pouches 20a, 20b of semicircular section placed one against the other, as shown in the cross-section of FIG. 6B, so that the pipe is covered by two identical pouches 20a, 20b, with the right and left ends along the axis ZZ advantageously tapering at 20c so as to fit as closely as possible to the outer pipe 1a in the zone between the outer pipe and the inner wall of the sleeve beyond the crimp welds 6a, 6b. This maximizes the volume of the pouch and thus its heat capacity.

In a preferred version of the invention as shown in FIG. 3, the insulating sleeve 1 includes in its middle, and inside its inside face 1b, a recess 21 into which a pouch 22 containing a said phase-change material is advantageously inserted, with its thickness, 1 cm to 5 cm, being such that once in place inside the insulating material, its inside diameter is slightly greater than the inside diameter of the inner wall 1b of said sleeve on either side of the hollow zone 21. To facilitate installing the pouch inside said insulating sleeve, it is advantageous to have two half-pouches of semicircular section 22a, 22b that are disposed diametrically opposite and one against the other, as shown in FIG. 3A, or indeed a single pouch that is split along a generator line 22c, as shown in FIG. 3B, and that is suitable for being rolled up so as to be inserted more easily into the hollow housing 21.

In a preferred version of the invention, the insulating sleeve is fabricated in two stages, as shown in FIGS. 4A, 4B, and 4C. In a first stage, the outer casing 1a is roto-molded in conventional manner, said outer casing having its ends 1c reinforced at 1e, i.e. of thickness greater than in the remainder thereof, which thickness lies in the range 5 mm to 6 mm. Thereafter, an inner casing is inserted inside said outer casing, the inner casing being constituted by a smooth tube 1b, e.g. obtained by continuous extrusion and cutting to length such that the length of said tube corresponds to the length of the outer casing 1a, as shown in FIG. 4a. Once insertion has been completed, the end 1e of said outer casing 1a is secured at 25 to said inner tube 1b, for example, and in conventional manner, by hot-air welding 26, or by welding under an atmosphere of inert gas, e.g. nitrogen, so as to seal the hollow wall of the insulating sleeve in order to enable it to be filled with an insulating gel 4.

FIGS. 8A and 8B are side views in section showing the stage of installing a sleeve on a J-lay tower 21 of an installation ship 20, at the junction between two strings 5a-5b as defined with reference to FIG. 5B. The pipe in suspension 5a is held within the J-lay tower by the collar 30 situated at the periphery of the forging 9a. The string 5b on which the sleeve 1 has previously been installed in a set-back position, i.e. spaced apart from the zone for assembling by welding, is then brought into contact with said suspended pipe 5a, and then welded thereto by an orbital welding device 31. After inspection and finishing operations, the sleeve is lowered by being slid along the axis ZZ' so that it lies astride said welding 7, preferably located at equal distances from its ends. The bottom end of said sleeve co-operates with a gasket, preferably an O-ring gasket 32 that is preinstalled on the suspended bottom string 5a. Thus, the gap or clearance 33 inside the sleeve, i.e. between the inner casing of the sleeve and said pouch(es) 20, 22 and the set of coaxial pipes 5a, 5b can be filled with a sticky filler compound 34 serving to secure the sleeve to the set of coaxial pipes, the compound preferably being a quasi-incompressible insulating material, and with filling taking place from the top end of said sleeve. The compound 34 may be a polyurethane resin, optionally filled with glass microbeads so as to provide the sleeve with additional insulation, or an insulating gel, or an aqueous gel, or indeed a gel including a phase-change material.

In FIG. 5B, because the string 5a has a collar 30, said sleeve advantageously presents in its bottom portion an inside diameter 35a that is greater than the inside diameter 35b of its top portion, said diameter 35a being slightly greater than the outside diameter of said collar 30. This serves to minimize the quantity of filler material in the top portion of the sleeve above the collar 30, and in certain circumstances to minimize heat exchanges with the outside.

Figure 9A:
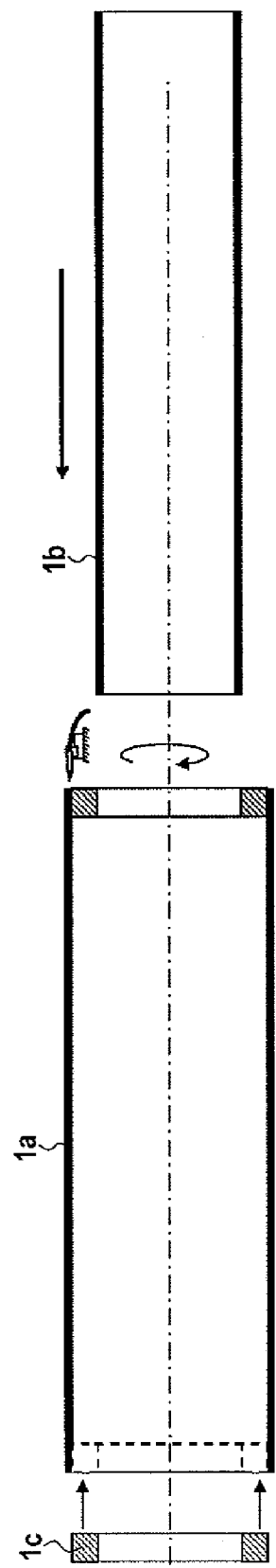
FIGS. 9A and 9B are side views in section showing cylindrical outer and inner casings 1a and 1b of circular section as obtained by extrusion and as assembled together at their longitudinal ends by annular collars 1c.
Figure 9B:
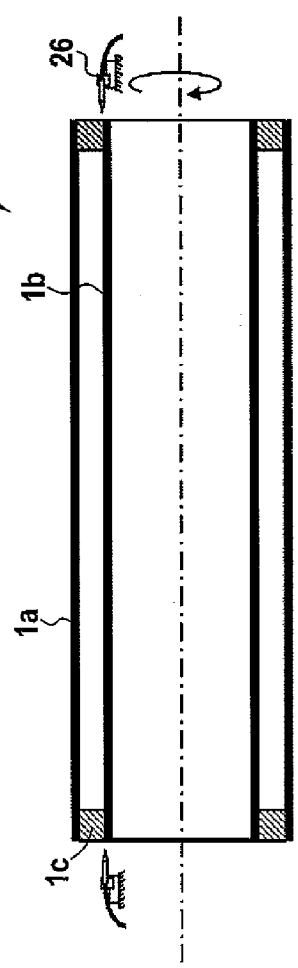

FIGS. 9A and 9B show a variant embodiment in which the outer and inner casings 1a and 1b of the sleeve are of rectilinear cylindrical shape, both being obtained by extrusion, e.g. being made of polyethylene, and having their longitudinal ends connected together by being heat-sealed onto annular collars that are inserted between said inner and outer casings 1b and 1a at their ends, heat-sealing being performed using a tool 26 as described above.

In FIGS. 5A and 5B, the two strings 5a, 5b have respective junction pieces 9a, 9b that are assembled together. Each said junction piece 9a, 9b is in the form of a body of revolution defined as follows:

in a radial direction relative to a longitudinal axis of revolution XX' of said piece, it is defined by a cylindrical inside wall having substantially the same diameter as the main portion of said inner pipe 5a2-5b2, and by a cylindrical outer wall of diameter substantially equal to the outside diameter of the main portion of said outer pipe 5a1-5b1; and in the longitudinal axial direction ZZ':

at the end of said junction piece assembled by welding 8a to the end of said outer and inner pipes of a said unit element of an assembly of at least two coaxial pipes, said outer and inner walls of said junction piece forming in longitudinal section outer and inner first branches $13_1$ and $13_2$ having substantially the same thicknesses as said outer and inner pipes 5a1 and 5b1 to which they are assembled, said outer and inner first branches $13_1$ and $13_2$ defining a first annular cavity 14; and at the opposite end of said junction piece that is assembled to another said junction piece, itself assembled by welding 8a, 8b to the end of another said unit element comprising a set of two coaxial pipes, said outer and inner walls form in longitudinal section respective outer and inner second branches $15_1$ and $15_2$ defining a second annular cavity 16;

said first and second junction pieces being welded to each other solely via the ends of said outer second branches $15_1$; and the ends of said two inner branches $15_2$ that are not welded together coming into contacting abutment one against the other, such that said second annular cavities 16 are not sealed from the inside of said inner wall and said inner pipe; and the ends of said first and second cavities 14, 16 being spaced apart in the longitudinal direction ZZ' so as to define a massive solid zone of said junction piece in which said outer and inner walls form the outer and inner faces of a single cylindrical wall, the ends of said first and second cavities 14 and 16 being spaced apart by a length equal to at least 0.5 times the maximum thickness of the wall of said junction piece in said solid zone (10), and preferably of a length greater than said maximum thickness.

Said second annular cavities are designed to be filled with the same fluid as that flowing inside the inner pipe.

The abutment between the free ends of the second inner branches of the two junction pieces when assembled to each other provides quasi-continuity for the inner pipe and serves to avoid vortex type turbulence phenomena occurring in the flow of fluid inside the set of pipes at the connection between the two junction pieces.

Furthermore, the fact that two adjacent junction pieces are welded together solely via the ends of said outer second branches enables all of the phenomena involved in transferring loads and stresses to be localized at the outer level without involving said inner walls, thus making it possible to achieve better inspection relating to the risk of cracking or fatigue phenomena, while avoiding any danger of the device collapsing completely at its inner wall.

In addition, because the two ends of said inner second branches of two adjacent pieces of the invention are not welded together, small movements are accommodated between said facing inner walls as a result of possible flexing or variations in pressure or temperature, and it is possible for said inner walls to deform plastically, allowing said inner second branches to become hammered at their edges without any risk of transferring contact compression loads, thus making it possible to avoid disturbing the distribution of stresses within the assembly zone, ensuring that substantially all of the stresses are taken up via the outer walls of said pieces.

Finally, the massive solid zone between the ends of said first and second cavities serves to transfer compression or traction forces between the inner and outer pipes.

All of these characteristics contribute to greatly improving the bending behavior and also the fatigue behavior of a device involving two coaxial set elements fitted with said junction pieces and connected together on board installation ships.

The invention claimed is:

1. An assembly of coaxial pipes of the PiP type, comprising at least two coaxial pipe unit elements each comprising an inner pipe and an outer pipe, with an annular space and assembled end to end by welding to form a welded junction zone, wherein the assembly includes a sleeve with a hollow tubular wall made of rigid or semirigid material surrounding said outer pipe of said assembly of coaxial pipes, in register with the welded junction zone between said two coaxial pipe unit elements, said hollow tubular wall of the sleeve comprising an outer casing and an inner casing connected together at their longitudinal ends in leaktight manner, thereby defining an internal volume that is completely filled with a quasi-incompressible thermally insulating material implementable in said internal volume in a liquid state and being gelled or cross-linked thereafter, said sleeve extending over only a portion of each of said two unit elements and including said welding.

2. The assembly of coaxial pipes according to claim 1, wherein said quasi-incompressible thermally insulating material is an insulating gel made of particles or microcapsules of a first insulating compound comprising an alkane having a hydrocarbon chain of at least 10 carbon atoms, said particles being dispersed within a matrix of a second compound comprising a cross-linked polymer, said matrix thus confining said insulating first compound.

3. The assembly of coaxial pipes according to claim 1, wherein at least said inner casing or said outer casing of said sleeve is formed integrally with connection elements at its longitudinal ends, said inner or outer casing and said connection elements forming a single piece suitable for closing the space between the inner and outer casings of the hollow tubular wall of the sleeve at their ends, said single piece being made of thermostatic material of small thickness, less than 10 mm, being obtained by rotational molding, and said piece being fastened to the other casing, respectively the outer or the inner casing, of the hollow tubular wall of the sleeve via said connection elements.

4. The assembly of coaxial pipes according to claim 3, wherein said piece obtained by rotational molding comprises a said inner or outer casing of the sleeve together with said end connection elements, and includes corrugations or grooves forming rounded or square projections or recesses in said inner casing or in said outer casing of the sleeve, said corrugations or grooves forming local variations in the diameter of said casing, each corrugation or groove extending over a distance along the length of the said casing, and wherein said corrugations or grooves are regularly spaced apart over the length of the casing.

5. The assembly of coaxial pipes according to claim 3, wherein one of said inner or outer casings of said sleeve that is made integrally with said end connection elements as a single piece is obtained by rotational molding, while the other casing of the sleeve, respectively the outer or the inner casing, is obtained by extrusion or by rotational molding, and is fastened to said connection elements by adhesive or by heat-sealing.

6. The assembly of coaxial pipes according to claim 1, wherein said hollow tubular wall comprising said inner and outer casings and said end connection elements is obtained as a single piece in the form of a one-piece rotational molding.

7. The assembly of coaxial pipes according to claim 1, wherein said inner casing of said hollow tubular wall of the sleeve includes a middle zone of diameter greater than the end zones adjacent thereto on either side thereof, thus forming a setback in which at least one first leaktight pouch is received surrounding the entire periphery of said coaxial pipe assembly, the pouch being filled with a non-insulating phase-change material.

8. The assembly of coaxial pipes according to claim 7, wherein said outer casing of the tubular wall of the sleeve includes a middle portion of diameter greater than the end zones adjacent thereto, in register with said greater diameter middle zone of said inner casing, so as to maintain a substantially constant thickness of quasi-incompressible insulating material within the casing in said middle zone over the entire length of said sleeve.

9. The assembly of coaxial pipes according to claim 1, wherein said sleeve further includes a filler material filling the space or clearance between said inner casing of the tubular wall of the sleeve and said outer pipe or where appropriate inner pipe of the coaxial pipe assembly, said filler material connecting said sleeve to said coaxial pipe assembly, and being a hardenable filler material of the resin or cement type.

10. The assembly of coaxial pipes according to 1, wherein each of said unit elements of the assembled coaxial pipe assembly includes at its ends a junction piece forming a body of revolution connected to said inner and outer pipes at one end of the junction piece, with the two junction pieces being assembled to each other by welding at their opposite ends, said sleeve being centered over the weld joining the two junction pieces together and extending beyond the connection welds between said junction pieces and each of said coaxial pipe assembly unit elements, said sleeve extending over only a portion of said two unit elements.

11. The assembly of coaxial pipes according to claim 1, wherein each said coaxial pipe unit element includes an outer pipe end that is set back from the end of the inner pipe, the annular space between said outer and inner pipes being closed by crimping, which consists in deforming the terminal portion of the outer pipe so that its end is directly connected to the surface of the inner pipe by welding, and the two coaxial pipe unit elements are assembled together by welding to each other via the ends of their inner pipes, said sleeve extending over a distance of at least 50 cm over said outer pipe beyond the crimp welds, and the space between the inner casing of said sleeve and the inner pipe of the coaxial pipe assembly between the two crimp welds is filled with an insulating material contained in at least one second leaktight pouch completely surrounding said inner pipe, the longitudinal end(s) of said pouch(es) presenting in axial longitudinal section a profile that is chamfered in such a manner as to fit as closely as possible to said outer pipe after the crimp zone between said outer pipe and said inner casing of said sleeve.

12. The assembly of coaxial pipes according to claim 1, wherein each said coaxial pipe unit element includes at its end a said junction piece, said two junction pieces being connected together by welding, and one of said junction pieces including in its outside surface a projection in the form of an abutment or a collar suitable for enabling the coaxial pipe unit element that is connected thereto to be held in suspension in a vertical or an inclined position from a laying ship at sea, and said tubular sleeve includes an end zone with an inner casing of diameter greater than the diameter of the longitudinally opposite end, said greater-diameter end zone of the inner casing covering the coaxial pipe assembly inside said sleeve, at least starting from said projection or collar.

13. The assembly of coaxial pipes according to claim 7, wherein said sleeve contains said first and/or second pouches forming pairs of diametrically opposite semicylindrical pouches on either side of said coaxial pipe assembly.

14. The assembly of coaxial pipes according to claim 1, wherein the length of said sleeve lies in the range 1 m to 10 m and is of thickness lying in the range 5 cm to 25 cm, and said inner and outer casings of the tubular wall of the sleeve present thicknesses lying in the range 2 mm to 10 mm.

15. A thermally insulating sleeve having a hollow tubular wall filled with a quasi-incompressible thermally insulating material, said hollow tubular wall being made of a rigid or semi-rigid material and comprising at least one outer casing and at least one inner casing, said at least one outer casing and said at least one inner casing connected together at their longitudinal ends in a leaktight manner to form a single piece in the form of a one-piece rotational molding, and defining an internal volume that is completely filled with a quasi-incompressible thermally insulating material implementable in said internal volume in a liquid state and being gelled or cross-linked thereafter.

16. The assembly of coaxial pipes according to claim 6, wherein the inner casing is configured as a slightly conical shape, without said corrugation or grooves, so as to enable the inner casing to b unmolded.

17. The assembly of coaxial pipes according to claim 6, wherein said piece obtained by rotational molding comprises said inner or outer casing of the sleeve together with said end connection elements, and includes corrugations or grooves forming rounded or square projections or recesses in said inner casing or in said outer casing of the sleeve.

18. The assembly of coaxial pipes according to claim 2, wherein the first compound is kerosene and the second compound is polyurethane.

* * * * *